Sept. 23, 1958     P. P. ANDERSON, JR     2,853,276
AIR CONDITIONING
Original Filed Aug. 25, 1952
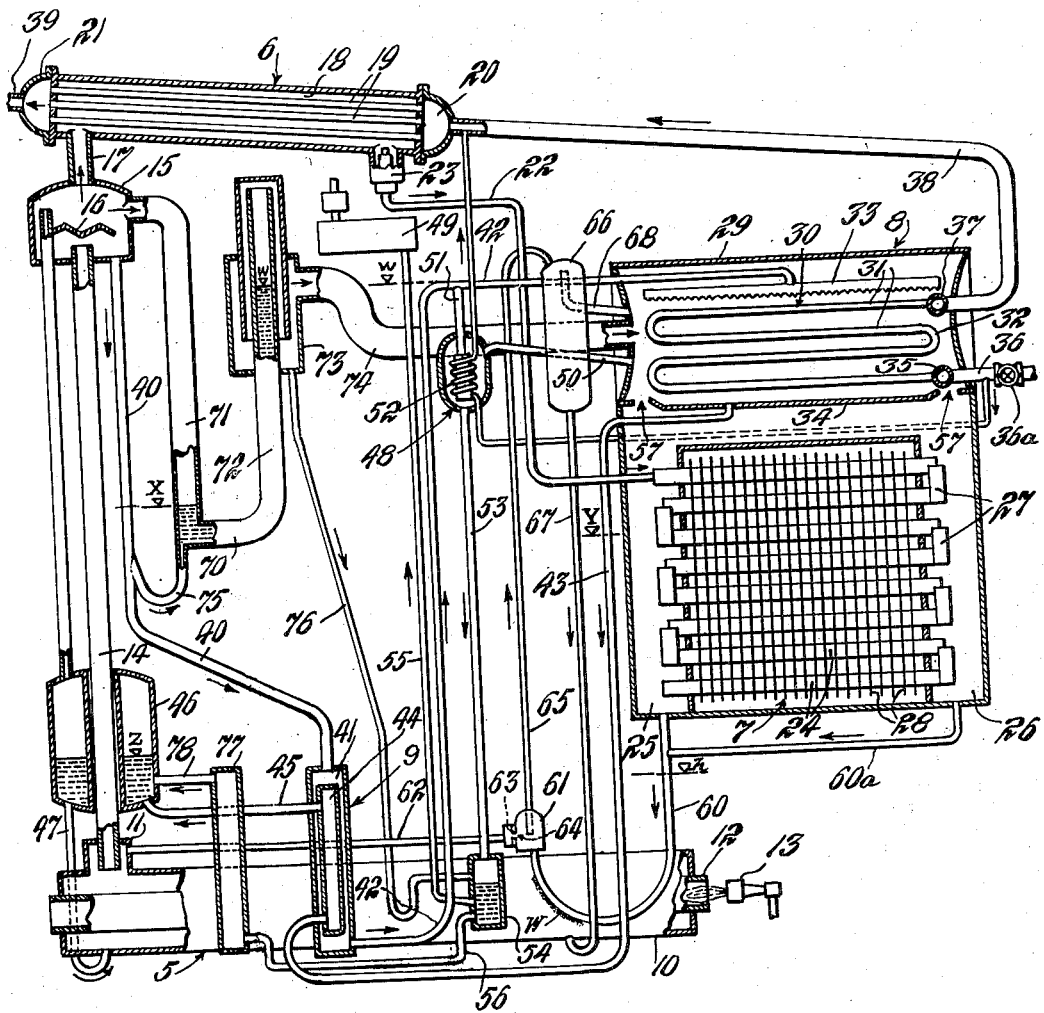
INVENTOR.
PHILIP P. ANDERSON, JR.
BY
ATTORNEY

United States Patent Office 2,853,276
Patented Sept. 23, 1958

2,853,276

AIR CONDITIONING

Philip P. Anderson, Jr., Evansville, Ind., assignor, by mesne assignments, to Arkla Air Conditioning Corporation, a corporation of Delaware Continuation of abandoned application Serial No. 306,242, August 25, 1952. This application October 3, 1955, Serial No. 538,117

6 Claims. (Cl. 257—9)

This application is a continuation of my prior application Serial No. 306,242 filed August 25, 1952, allowed August 15, 1955, now abandoned, and relates back to said prior application on all common subject matter.

The present invention relates to the art of heating and cooling and particularly to air conditioning wherein the same heat exchanger serves as both a heater and a cooler.

More particularly this invention relates to heating and cooling apparatus which uses an absorption refrigerating system of the two pressure type wherein during cooling cycles of operation air or other media to be cooled is passed in heat exchange relation with the evaporator of such system to be cooled thereby, and during heating cycles of operation the air or other media to be heated is passed in heat exchange relation with the same evaporator, which now functions as a heater. To render the evaporator a heat exchanger for both heating and cooling, the refrigerating system is constructed in a manner that during cooling periods of operation refrigerant vapor is expelled from solution in the generator, condensed to liquid in the condenser and the liquid refrigerant is vaporized in the evaporator to produce the desired cooling effect. Whereas, during heating cycles of operation the refrigerant vapor expelled from solution in the generator is by-passed around the condenser and flows as hot vapor to the evaporator wherein the vapor is condensed giving up its latent heat of condensation to air or other media thereby heating such media. The copending application for Letters Patent of Norton E. Berry, Serial No. 286,677, filed May 8, 1952, now abandoned, which copending application is a continuation of and relates back for common subject matter to the now abandoned Berry application, Serial No. 703,788, filed October 17, 1946, discloses a heating and cooling system of the above type.

Heretofore, with heating and cooling systems of the above type, the generator operates at much higher temperatures during heating than during cooling cycles. In such systems, the absorption solution is circulated through the absorber and through the liquid heat exchanger during heating cycles, with the result that cooling water standing in the absorber cooling coil is apt to be heated beyond its boiling point and the temperature of the whole liquid heat exchanger is appreciably higher than that of the hottest part of this exchanger during the cooling cycle. Since, in a system of this type, the corrosion rate increases with temperature—approximately doubling for each 10° C. rise—and since the liquid heat exchanger contains a relatively large surface area which has no particular function during the heating cycle, I have discovered that it is desirable to by-pass the absorber and the liquid heat exchanger during heating cycles. Also, in order to decrease the temperature of the absorption solution circuit, it is desirable to dilute the absorption solution for the heating cycle. That is, during the heating cycle, the refrigerant-absorbent solution, as will appear hereinafter, should contain more refrigerant, more water in this case. Since the water used for dilution on the heating cycle must be removed and stored out of the active circuit on the cooling cycle, the amount of such water should be kept to a minimum.

In accordance with my invention, a two pressure absorption refrigerating system is constructed in a manner that during cooling cycles of operation absorption solution, which has been concentrated in the generator by expelling refrigerant vapor therefrom, passes from the generator through the liquid heat exchanger to the obsorber and enriched absorption solution flows from the absorber through the liquid heat exchanger back to the generator. Whereas, during heating cycles of operation absorption solution which has been concentrated in the generator by expelling refrigerant vapor therefrom is returned to the generator without passing through the absorber and without passing through the liquid heat exchanger. This arrangement removes the absorber and the liquid heat exchanger from the active solution circuit during the heating cycle so that the temperature of the liquid heat exchanger is approximately that of the ambient.

The arrangement herein described by-passes the absorption solution around the absorber and the liquid heat exchanger during heating cycles and it utilizes the liquid heat exchanger and certain of the connecting conduits between the heat exchanger, generator and absorber for storing absorption solution out of the active circuit during heating cycles. The storing of absorption solution out of the active circuit during heating cycles appreciably reduces the amount of water required for diluting the solution in the active circuit, it reduces the operating temperature of the generator, it permits the liquid heat exchanger to stand at substantially ambient temperature during heating cycles of operation, and it increases the overall life expectancy of the apparatus.

The invention tgoether with its objects and advantages is set forth in more technical detail in the following description and accompanying drawing in which the single figure shows more or less diagrammatically an apparatus for heating and cooling in accordance with this invention.

Referring to the drawing, I have embodied my invention in a two pressure absorption refrigeration system generally as shown and described in my copending application issued as United States Patent No. 2,685,782, granted August 10, 1954. This system includes a generator 5, a condenser 6, an evaporator 7, an absorber 8 and a liquid heat exchanger 9 interconnected for the circulation of refrigerant and absorbent. The system is hermetically sealed, evacuated of all air or other gases and contains a water solution of a salt such as lithium bromide. Water, constituting the refrigerant, is expelled from solution by the application of heat and the concentrated salt solution from which the water has been expelled constitutes the absorbent.

The generator 5 may take other forms and as illustrated in the drawing is generally similar to that illustrated and described in the United States Patent No. 2,625,800, dated January 20, 1953. Suffice it to state herein that the generator 5 comprises a horizontally arranged cylindrical vessel 10 closed at both ends and having a vapor dome or chamber 11 located at the top thereof preferably at one end. A flue 12 extends axially of the generator vessel 10 through which the products of combustion from a gas burner 13 or the like flow to heat the solution. The lower end of a vertical vapor liquid-lift tube 14 projects into the vapor chamber 11 and a separating chamber 15 surrounds and encloses the upper end of the lift conduit. Baffles 16 in the separating chamber 15 separate the refrigerant vapor from solution issuing from the upper end of the lift conduit.

A vapor pipe 17 connects the separating chamber 15 to the condenser 6. The condenser 6 comprises a shell forming a chamber 18 with tubes 19 extending therethrough between headers 20 and 21. Liquid refrigerant condensed in condenser 6 flows to the evaporator 7 through a conduit 22. A device 23 in conduit 22 has an orifice therein for permitting the flow of liquid refrigerant and non-condensable gases while maintaining the difference in pressure between the condenser and evaporator as illustrated and described in United States Letters Patent to Norton E. Berry, No. 2,563,575, granted August 7, 1951.

The evaporator 7 comprises a series of tubes 24 arranged one over the other with their ends extending into spaced headers 25 and 26. Cups 27, mounted at the ends of alternate tubes of each row in the respective headers 25 and 26, underlie the end of the next uppermost tube so that refrigerant flows by gravity through successive tubes from the top to the bottom of the evaporator. The headers 25 and 26 are connected to deliver refrigerant vapor from the evaporator tubes 24 to the absorber 8. Heat transfer fins 28 are arranged in spaced relation on the evaporator tubes 24 and air or other media to be cooled flows over the tubes and between the fins.

The absorber 8 comprises a shell 29 enclosing a serpentine coil or series of coils 30 arranged in parallel. Each coil 30 comprises a plurality of straight tube sections 31 arranged one over the other in a vertical plane with the ends of the alternate tubes connected by elbows 32 to provide a continuous serpentine coil. Overlying the serpentine coil 30 or plurality of such coils is a liquid distributor 33 for delivering absorption solution weak in refrigerant onto the uppermost horizontal tube section 31 of each coil which solution drips from each coil section to the next lowermost coil section from the top to the bottom of the absorber. Underlying the coils 30 is a tray 34 for collecting absorption solution dripping from the coils. The lower or inlet ends of the coils 30 are connected by a header 35 and the header, in turn, is connected by a conduit 36 to a supply of cooling water such as a city main or a cooling tower. The conduit 36 is provided with a valve 36a for controlling the flow of water therethrough. The upper or outlet ends of the coils 30 are connected by a header 37 which, in turn, is connected by a conduit 38 to the header 20 of the condenser 6. Thus, with the valve 36a open, cooling water flows through the absorber coils 30 and tubes 19 of the condenser, successively, and the cooling water is discharged from the outlet header 21 of the condenser through a discharge conduit 39.

During cooling cycles of operation absorption solution weak in refrigerant is delivered from the separating chamber 15 to the liquid distributor 33 in the absorber 8 through a path of flow comprising a conduit 40, an outer passage 41 of the liquid heat exchanger 9 and a conduit 42. Absorption solution strong in refrigerant flows from the tray 34 at the bottom of the absorber 8 to the generator 5 in a path of flow comprising a conduit 43, an inner passage 44 of the liquid heat exchanger 9, a conduit 45, a leveling vessel 46, and a conduit 47. Thus, during cooling periods of operation, the absorption solution circuit comprises the generator 5, vapor liquid-lift 14, liquid heat exchanger 9 and absorber 8 so connected and arranged that absorption solution raised by the vapor liquid-lift flows by gravity to the absorber and back to the generator.

The leveling vessel 46 is adapted to receive the absorption solution flowing from the absorber 8 and has a relatively large cross-sectional area so that variations in the amount of absorbent delivered thereto will not materially affect the liquid level to maintain a substantially constant hydrostatic reaction head on the vapor liquid-lift 14. The absorber 8 is located above the liquid level in the leveling vessel 46 in the absorption solution circuit to maintain pressure balancing hydrostatic columns of solution in conduits 42 and 43 of a height to balance the difference in pressures in the absorber 8 and in the generator 5. During cooling cycles of operation of the system solution will stand at some level $x$ in conduit 40 connected to conduit 42 through the liquid heat exchanger 9, at a level $y$ in conduit 43, and at a level $z$ in the leveling chamber 46.

A purge device 48 is provided for continually withdrawing surplus non-condensable gases from the system and transferring them to a storage vessel 49. The purge device 48 comprises an auxiliary absorber vessel connected to the main absorber 8 through a suction tube 50 for producing a relative vacuum therein and is generally similar to the purge device described and claimed in United State patent to Lowell McNeely No. 2,473,384, issued June 14, 1949. The purge device 48 has a connection 51 to conduit 42 for supplying absorption solution weak in refrigerant thereto, a cooling coil 52 therein connected between the conduits 36 and 38 and a fall tube 53 depending from the bottom thereof. A separating chamber or gas trap 54 receives the lower end of the fall tube 53 and is connected by a riser 55 to the gas storage vessel 49 and by a conduit 56 to a vessel 77, to be referred to in more detail hereinafter. For a detailed description of this purge device reference may be had to the above McNeely patent.

The evaporator 7 is located below the absorber 8 and the headers 25 and 26 are connected through openings 57 to the bottom of the absorber shell 29. The bottom of the evaporator 7 is located above the lowest static liquid level existing in the absorption solution circuit in the leveling chamber 46 or in the generator 5 between periods of operation, and means are provided to drain liquid from the evaporator to the absorption solution circuit between periods of operation and lift any unevaporated liquid refrigerant or condensate from the bottom of the evaporator into a concentration control arrangement during periods of operation. As illustrated, the drain means comprises a depending U-shaped conduit 60 having its upper end connected to the bottom of the evaporator header 25 and its lower end connected to the bottom of an auxiliary vapor liquid-lift chamber 61. A branch conduit 60a connects the bottom of the evaporator header 26 to the down leg of conduit 60. The up leg of conduit 60 is heated by thermal contact with the shell 10 of the generator to which it is welded, as indicated at W.

One side of the auxiliary vapor liquid-lift chamber 61 is connected by a horizontal conduit 62 to the vapor dome or chamber 11 of the generator 5. The conduit 60, auxiliary lift chamber 61 and conduit 62 are so arranged as to provide a hydraulic gradient from the bottom of the evaporator headers 25 and 26 to the vapor chamber 11 of the generator 5 for gravity flow of liquid therethrough and a riser for producing a hydrostatic reaction head on the auxiliary lift chamber. A septum 63 having an orifice 64 therein is located in the vapor liquid-lift chamber 61 adjacent one end of the conduit 62. The orifice 64 is of such size as to permit absorption solution or liquid refrigerant to flow slowly from the evaporator headers 25 and 26 to the vapor chamber 11 of generator 5 between periods of operation while limiting the amount of vapor flowing from the generator to the auxiliary vapor liquid-lift chamber 61 during periods of operation.

An auxiliary vapor liquid-lift tube 65 has its lower end projecting into the dome of chamber 61 in the drain conduit and its upper end is connected to the top of a concentration control vessel 66. The concentration control vessel 66 is generally similar to that described and claimed in United States Letters Patent to Lowell McNeely No. 2,465,904 issued March 29, 1949. The bottom of the vessel 66 is connected by a down tube 67 to the generator 5. The concentration control vessel is located above the liquid level $z$ in the leveling chamber 46 a distance sufficient to maintain a column of liquid refrigerant in tube 67 and in the vessel of a height to balance the difference in pressure between the absorber 8 and the generator 5. A vent tube 68 connects the shell 29 of the absorber 8 to the interior of the concentration control vessel 66 to maintain the pressure therein the same as that in the absorber.

During transportation of the apparatus from the factory where it is manufactured to the place it is to be installed, absorption solution may enter the evaporator 7 due to tipping or tilting the unit. When the unit is installed in its upright position at the location where it is to be used, such absorption solution will flow from the tubes 24 into headers 25 and 26 and from the headers through the drain conduits 60 and 60a into the chamber 61 of auxiliary vapor liquid-lift 65. From the chamber the liquid will flow through the orifice 64 in septum 63 and conduit 62 into the chamber 11 of the generator 5. Due to the fact that the bottom of the evaporator headers 25 and 26 are located above the lowest static liquid level in the absorption solution circuit, such flow of absorption solution or other liquid is insured.

To initiate operation of the system, gas burner 13 is ignited and the products of combustion flow through the flue 12 to heat the solution in the generator 5. Heating of the solution expels refrigerant vapor therefrom which accumulates at the top of the generator and displaces liquid from the vapor chamber 11. When sufficient vapor has been generated to depress the liquid level below the end of the lift tube 14, vapor will flow upwardly through the latter and carry droplets of absorption solution into the separating chamber 15 as described in the Berry Patent No. 2,625,800 referred to above. The cross-sectional area of the lift tube 14 is so correlated to the rate of vapor generation in the generator 5 as to cause the liquid absorbent to be lifted in the desired ratio of, for example, 14 pounds of solution for each pound of vapor generated. During cooling periods of operation vapor flows from separating chamber 15 through the vapor pipe 17 into the chamber 18 of the condenser 6 where it contacts the relatively cold tubes 19 and is condensed to a liquid. The liquid refrigerant flows through the orifice device 23 and conduit 22 into one end of the uppermost tube 24 of the evaporator 7 and flows by gravity through successive tubes 24 and cups 27 from the top to the bottom of the evaporator.

Simultaneously, absorption solution weak in refrigerant flows from the separating chamber 15 through conduit 40, the outer passage 41 of heat exchanger 9 and conduit 42 to the liquid distributor 33 in the absorber 8. The absorption solution is distributed onto the uppermost straight tube sections 31 of the serpentine coils 30 and drips from each tube section onto the next lowermost tube from the top to the bottom of the absorber 8. Refrigerant vapor flows from the evaporator headers 25 and 26 through the openings 57 into the shell 29 of the absorber 8 and is absorbed in the absorption solution on the serpentine coils 30. Due to the affinity of the refrigerant vapor for absorption solution the liquid refrigerant evaporates in the tubes 24 of the evaporator 7 at a low vapor pressure to produce a refrigerating effect therein. Air or other media flowing over the evaporator 7 is cooled by contact with the chilled tubes 24 and fins 28 and the heat from the air is transferred through the walls of the tubes and causes the refrigerant therein to evaporate. Absorption solution strong in refrigerant flows by gravity from the tray 34 through the conduit 43, the inner passage 44 of the liquid heat exchanger 9, conduit 45, leveling vessel 46 and conduit 47 back to the generator 5.

During cooling cycles of operation of the system any unevaporated liquid refrigerant overflowing from the lowermost tube 24 of the evaporator enters the header 25 and drains into conduit 60. The liquid refrigerant in the up leg of conduit 60 is heated through the wall of the conduit welded at w to the shell 10 of the generator. Such heating should be sufficient to increase the temperature of the maximum amount of liquid refrigerant expected to overflow to its boiling point at the pressure at the lower end of the auxiliary vapor liquid-lift conduit 65. Refrigerant vapor flows continuously from the vapor chamber 11 of generator 5 through conduit 62 into the chamber 61 but the orifice 64 limits this flow of vapor. When no liquid refrigerant is overflowing from the evaporator, such vapor can flow through the conduits 60 and 60a and the headers 25 and 26 of the evaporator into the absorber 8 or through the auxiliary lift conduit 65, concentration control vessel 66 and vent pipe 68 into the absorber 8.

Due to the extremely low pressure prevailing in the system, the amount of vapor flowing through the orifice 64 constitutes a negligible amount of refrigerant expelled from solution in the generator 5, less than one percent. However, when liquid refrigerant is overflowing from the lowermost tube 24 of the evaporator and accumulates in the drain tube 60 to a height $h$ sufficient to produce a reaction head, the vapor entering the chamber 61 through the orifice 64 will then operate to lift the liquid refrigerant through the auxiliary vapor liquid lift 65 into the concentration control vessel 66. The introduction of vapor into the heated liquid refrigerant also agitates the liquid to initiate boiling of superheated liquid which prevents liquid from backing up into header 25 of the evaporator 7.

During cooling cycles of operation, liquid refrigerant introduced into the concentration control vessel 66 will displace any other liquid therein and be stored in a liquid column of a height to balance the difference in pressure between the absorber 8 and the generator 5. Such storage of liquid refrigerant out of the absorption solution circuit increases the concentration of the absorption solution which, in turn, reduces the vapor pressure and temperature in the evaporator 7 to increase the rate of evaporation therein. The storage of liquid refrigerant in the concentration control vessel 66 continues until substantially all of the refrigerant supplied to the evaporator 7 is evaporated therein. Such a concentration control operates advantageously to compensate for changes in operating conditions such as the cooling water temperature. At high cooling water temperatures the height of the pressure balancing liquid column and the amount of refrigerant stored increases and at low cooling water temperatures the height of the liquid column and amount of refrigerant stored decreases. Between cooling periods of operation any liquid refrigerant in the concentration control vessel 66 will drain through conduit 67 to the generator 5.

As thus described, the absorption refrigerating system and the operation thereof during cooling cycles of operation is substantially identical with that of my United States Patent No. 2,685,782 referred to above.

A vapor by-pass generally similar to that described and claimed in a patent application of Norton E. Berry Serial No. 306,241, now abandoned, filed concurrently with application Serial No. 306,242 of which the instant application is a continuation, is connected between the high and low pressure sides of the system for flow of hot vapor from the generator to the evaporator during heating cycles of operation.

In accordance with this invention, this vapor by-pass comprises a liquid trap 70 having a down leg 71 connected to the top of the separating chamber 15 and an up leg 72 projecting into the top of an auxiliary separating chamber 73. A vapor conduit 74 connects the auxiliary separating chamber 73 to the shell 29 of the absorber for flow of vapor to the absorber shell during heating cycles of operation, which vapor flows through the openings 57 into the headers 25 and 26 of the evaporator. If desired, the conduit 74 may be connected directly to one or both of the evaporator headers. Weak absorption solution is fed into the liquid trap 70 from the weak solution conduit 40 through a small liquid trap 75. The presence of the trap 75 in the line between the conduit 40 and the trap 70 minimizes the flow of hot solution to the trap 70 by convection during cooling cycles. This is desirable since any such flow of hot solution may result in some flashing of solution in the up leg 72 with resultant loss of uncondensed refrigerant vapor during cooling cycles of operation. An additional liquid trap comprising a conduit 76, the gas trap 54, conduit 56, vessel 77 and a conduit 78 connects the auxiliary separating chamber 73 to the leveling chamber 46 for flow of weak solution to the leveling chamber during heating cycles of operation and for balancing the pressure between the high and low pressure sides of the system during cooling cycles of operation. The vessel 77 is of such volume as to insure that the liquid trap of which it is a part, between the leveling chamber 46 and the auxiliary separating chamber 73 always contains sufficient solution to maintain a liquid seal regardless of fluctuations in solution level in the leveling chamber.

When the system is operating on a cooling cycle with the highest practical temperature of cooling water flowing from the conduit 36 into and through the absorber cooling coil 30 and from there through the conduit 38 into and through the condenser cooling tubes 19, the solution level in the down leg 71 of the trap 70 will be just above the bottom of the trap as indicated at $x$ corresponding substantially to the effective solution level in the weak solution conduit 40 leading from the vapor separating chamber 15. The solution level in the up leg 72 will generally be that of the top of the weak solution conduit 42 leading to the absorber distributor 33. However, under certain conditions the solution densities involved may be such that this level will be somewhat above or below this point. Accordingly, the up leg 72 of the trap 70 is sufficiently extended to prevent blowing of this trap under unusual conditions of cooling cycle operation.

During a heating cycle of operation of the system, the valve 36a in the cooling water line 36 is closed, either manually or automatically, so that cooling water does not flow through the cooling coil of the absorber or the cooling tubes of the condenser. Now, as the high side pressure rises above the maximum allowed on cooling cycle operations, the trap 70 is blown of liquid and vapor passes from the separating chamber 15 into and through the trap 70, through the auxiliary vapor separating chamber 73, through conduit 74 into the absorber shell 29, and from there the vapor flows through the openings 57 into the headers 25 and 26 of the evaporator 7, which evaporator now functions as a heating element. At the same time, weak absorption solution flows from the separating chamber 15 through the upper part of conduit 40, through the liquid trap 75 into the bottom of the trap 70, through which the solution is carried by means of the flowing vapor through the up leg 72 and into the auxiliary separating chamber 73, where the solution is separated from the generator vapor. The absorption solution flows from the bottom of the auxiliary separating chamber 73 through the conduit 76, gas trap 54, conduit 56, vessel 77, conduit 78, leveling vessel 46 and conduit 47 back to the generator 5.

The effect of the carrying of solution through the trap 70 in the above manner is to reduce the pressure difference between the high and low pressure sides of the system from that of the maximum provided for on cooling cycles of operation to only that required as reaction head to effect the carrying of the solution through the trap 70 on heating cycles of operation. As disclosed in the above Berry application Serial No. 306,241, filed concurrently with application Serial No. 306,242 of which the instant application is a continuation, it has been found in practice that this pressure difference can thus be reduced by at least 60% over previous designs. The use of the auxiliary separating chamber 73 and the conduit 76, gas trap 54, conduit 56, vessel 77 and conduit 78 makes it possible to return the hot weak solution to the generator without passing through the absorber 8, the liquid heat exchanger 9 and interconnecting conduits during heating cycles of operation. In other words during heating cycles of operation, solution stands more or less dormant in the lower portion of conduit 40, the outer passage 41 of the liquid heat exchanger, conduit 42, conduit 43, the inner passage 44 of the liquid heat exchanger and conduit 45. Thus, the solution standing in these elements is in effect withdrawn from the active solution circuit during heating cycles of operation and the amount of water required to dilute the solution in active circuit is reduced.

Conduit 76 may be connected directly between the auxiliary separating chamber 73 and the vessel 77 for flow of absorption solution to the latter during heating cycle operation. However, by flowing absorption solution from the auxiliary separating chamber through conduit 76 into the gas trap 54 and from there through conduit 56 into vessel 77, any refrigerant vapor that may condense in the auxiliary absorber of the purge device 48, and flow therefrom as liquid refrigerant through conduit 53 into the gas trap 54, during heating cycle operation, will be picked up by the absorption solution flowing through the gas trap 54 and returned therewith to the generator. Otherwise, any liquid refrigerant that flows through conduit 53 into the gas trap 54 during heating cycles may find its way into and through the riser 55 to the gas storage vessel 49, thereby robbing the system of a part of its charge of liquid refrigerant during heating cycle operation.

The hot generator vapor that is introduced into the headers 25 and 26 of the evaporator passes into and through the evaporator tubes 24 wherein the vapor is condensed giving up its latent heat of condensation to air or other media that passes over the exterior of the tubes thereby heating such media. The condensate formed in the evaporator tubes flows from the lowermost of said tubes into the header 25 and from there into conduit 60. Any condensate formed in the header 26 of the evaporator flows therefrom through conduit 60a into conduit 60. From conduit 60, the condensate flows into vessel 61 from whence it is lifted through the auxiliary vapor lift 65 into the concentration control vessel 66. From vessel 66 the condensate flows through conduit 67 into the bottom of the generator 5, and the lifting vapor flows through conduit 68 into the absorber shell 29 whereinin it joins the generator vapor flowing thereto through conduit 74.

To shift from a heating cycle to a cooling cycle of operation all that is necessary is that the control valve 36a in the cooling water line 36 be open for flow of water through the absorber cooling coil 30 and through the condenser cooling tubes 19, so that now the vapor flowing from the generator is condensed in the condenser, the pressure in the high side of the system is reduced and the liquid trap 70 is again established whereupon the flow of vapor and solution through the system is the same as that described above in connection with the cooling cycle operation. In other words the system may be shifted from a heating cycle to a cooling cycle and from a cooling cycle to a heating cycle by merely opening or closing the valve 36a in the water line 36.

It is to be noted that, although the up leg 72 of the trap 70 extends an appreciable distance above the level $w$ at which liquid discharges from conduit 42 into the absorber distributor 33 during cooling cycles of operation, no liquid will discharge from conduit 42 into the absorber distributor during heating cycles of operation. This follows from the fact that during heating cycles of operation the fluid passing through the up leg 72 of the trap 70 is mostly vapor and therefore much lighter than the liquid in the conduit 42. By the same reasoning, during cooling cycles of operation, except for occasional flashing in the up leg 72, liquid will stand at substantially the level $w$ in this leg of the trap and liquid will overflow from conduit 42 into the absorber distributor 33.

Recapitulating, during cooling cycles of operation vapor generated in the generator 5 passes upward through the vapor lift 14 lifting droplets of weak absorption solution therewith into the separating chamber 15. The vapor separates from the weak absorption liquid and flows through conduit 17 into the condenser 6 wherein the vapor is condensed into liquid and the liquid flows through the orifice device 23 and conduit 22 into and through the evaporator tubes 24, which tubes now function as a cooler. The liquid evaporates in the tubes 24 and cools the air or other media flowing over the exterior thereof. Any unevaporated liquid refrigerant that flows from the lowermost tube 24 of the evaporator enters the header 25 and drains through conduit 60 into vessel 61. From vessel 61, the liquid refrigerant is lifted through the vapor lift 65 into the concentration control vessel 66 where the liquid is temporarily stored. Storage of liquid refrigerant out of the absorption solution circuit increases the concentration of the absorption solution which, in turn, reduces the vapor pressure and temperature in the evaporator 7 to increase the rate of evaporation therein. The weak absorption solution flows from the seperating chamber 15 through conduit 40, the outer passage 41 of the liquid heat exchanger 9 and conduit 42 into the distributor 33 of the absorber 8. The absorption liquid flows downward over the absorber cooling coil 30 absorbing refrigerant vapor which passes from the headers 25 and 26 of the evaporator into the absorber, and the strong absorption liquid flows from the absorber tray 34 through conduit 43, the inner passage 44 of the heat exchanger, conduit 45, leveling vessel 46 and conduit 47 back to the generator 5. Fluids in the liquid trap 70, the connecting vapor conduits between the separating chamber 15 and the absorber shell 29, and in the conduit 76, vessel 77 and conduit 78 between the auxiliary separating chamber 73 and the leveling vessel 46, stand more or less dormant during the above cooling cycle operation.

During heating cycle operations, the liquid is blown from trap 70 into the auxiliary separating chamber 73 and generator vapor passes from the separating chamber 15 through trap 70, through the up leg 72 into the separating chamber 73 and from there the vapor flows through conduit 74 into and through the absorber shell 29, and through the openings 57 into the evaporator headers 25 and 26. From the headers 25 and 26 the generator vapor passes through the tube 24 of the evaporator, which tubes now function as heating elements to heat air or other media passing thereover. The vapor is condensed in the evaporator tubes and flows as liquid from the lowermost tube into and through the header 25, conduit 60, vessel 61, vapor lift 65, vessel 66, and conduit 67 to the generator 5. The weak absorption liquid lifted by the vapor lift 14 into the separating chamber 15 flows therefrom through the upper portion of conduit 40 and trap 75 into the trap 70 wherein this absorption liquid is picked up by the high velocity vapor flowing through the trap 70 and carried through the up leg 72 into the separating chamber 73 from whence this liquid flows through conduit 76, gas trap 54, conduit 56, vessel 77, conduit 78, leveling vessel 46 and conduit 47 back to the generator 5. During heating cycles of operation, fluids in conduit 17, condenser 6 and conduit 22 stand more or less dormant, while the lower portion of conduit 40, the outer passage 41 of the liquid heat exchanger, conduit 42, conduit 43, the inner passage 44 of the liquid heat exchanger and conduit 45 hold absorption solution in storage out of the active solution circuit. Thus it is seen, with applicant's invention during heating cycle operation, the amount of water required for dilution is appreciably reduced, the operating temperature of the generator is appreciably reduced, the whole of the liquid heat exchanger stands substantially at ambient temperature, and the overall life expectancy of the apparatus is increased.

Without further description it is thought that the features and advantages of the invention will be readily apparent to those skilled in the art to which this invention appertains, and it will, of course, be understood that changes in form, proportions and minor details of construction may be resorted to without departing from the spirit of the invention and scope of the claims.

What is claimed is:

1. In a heating and cooling system, an absorption refrigeration apparatus of the two pressure type charged with a refrigerant-absorbent solution and including a generator, a condenser, an evaporator which functions as a cooler on cooling cycles and as a heater on heating cycles, an absorber, a liquid heat exchanger and bypass means connected between the high and low pressure sides of the apparatus for flow of refrigerant vapor to the evaporator during heating cycles and conduits interconnecting said elements to provide circuits for flow of refrigerant medium and absorption solution and for regulating flow of such fluids therethrough, said circuits including a first path of flow for absorption solution from the generator through the liquid heat exchanger to the absorber, a second path of flow for absorption solution from the absorber through the liquid heat exchanger to the generator, a third path of flow for absorption solution from the generator through a portion of said bypass means and back to the generator which during normal heating cycles of operation by-passes substantially all absorption solution from the generator around the absorber and the liquid heat exchanger, and means in one of said paths of flow operable responsive to a change in an internal condition in the apparatus for controlling the flow of fluid through the three paths of flow, said three paths of flow being interconnected in a manner such that during normal heating cycles of operation absorption solution stands substantially dormant in major portions of the first and second paths of flow and flows substantially continuously through the third path, whereas, during normal cooling cycles of operation absorption solution flows substantially continuously through the first and second paths of flow and stands substantially dormant in a major portion of the third path.

2. A heating and cooling system as set forth in claim 1 wherein said means includes means forming a pressure balancing liquid column between the high and low pressure sides of the apparatus.

3. A heating and cooling system as set forth in claim 1 wherein said third path of flow has at least a portion thereof connected between the generator and the evaporator in a manner that on heating cycles of operation refrigerant vapor and absorption solution flow therethrough and absorption solution stands dormant in the first and second paths of flow.

4. A heating and cooling system as set forth in claim 1 wherein absorption solution is propelled through at least a portion of said third path of flow by refrigerant vapor flowing from the generator to the evaporator.

5. A heating and cooling system as set forth in claim 1 which includes means for supplying a cooling medium to said condenser and absorber and for controlling the supply of such cooling medium, and wherein the flow of fluid through the three paths of flow is controlled responsive to the supply of such cooling medium.

6. In a heating and cooling apparatus of the two pressure type charged with a refrigerant-absorbent solution and comprising a generator, a condenser, an evaporator which functions as a cooler on cooling cycles and as a heater on heating cycles, an absorber, a liquid heat exchanger and bypass means connected between the high and low pressure sides of the apparatus for flow of refrigerant vapor to the evaporator during heating cycles and conduits interconnecting said elements to provide circuits for flow of refrigerant medium and absorption solution and for regulating the flow of such fluids therethrough, said circuits including a first path of flow for absorption solution on cooling cycles from the generator through the liquid heat exchanger to the absorber and a second path of flow from the absorber through the liquid heat exchanger back to the generator, the combination with such an apparatus of a third path of flow for absorption solution on heating cycles from the generator through a portion of said bypass means and back to the generator, said third path of flow being connected between the first and second paths of flow so as to by-pass the absorber and liquid heat exchanger, and means for controlling the flow of absorption solution through the separate paths of flow.

References Cited in the file of this patent

UNITED STATES PATENTS 2,749,095   Anderson et al. _____ June 5, 1956